US006681146B2

United States Patent
Kawase et al.

(10) Patent No.: US 6,681,146 B2
(45) Date of Patent: Jan. 20, 2004

(54) METHOD AND APPARATUS FOR CONTROLLING DRIVER MECHANISM IN NC MACHINE TOOL

(75) Inventors: Shinji Kawase, Yamatokoriyama (JP); Takayuki Ohji, Yamatokoriyama (JP); Hiroyuki Ozaki, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 170 days.

(21) Appl. No.: 09/954,049

(22) Filed: Sep. 18, 2001

(65) Prior Publication Data

US 2002/0035410 A1 Mar. 21, 2002

(30) Foreign Application Priority Data

Sep. 20, 2000 (JP) ........................................ 2000-284928

(51) Int. Cl.[7] .............................................. G06F 19/00
(52) U.S. Cl. ...................................... 700/193; 700/192
(58) Field of Search .............................. 700/193, 192, 700/186

(56) References Cited

U.S. PATENT DOCUMENTS

| 5,315,526 | A | | 5/1994 | Maeda et al. ................ 700/186 |
| 5,333,386 | A | * | 8/1994 | Breyer et al. ................. 33/1 M |
| 5,435,067 | A | * | 7/1995 | Uchida et al. ................ 33/1 PT |
| 6,232,736 | B1 | * | 5/2001 | Bullen ........................ 318/575 |
| 6,329,780 | B1 | * | 12/2001 | Ebihara et al. ............. 318/649 |
| 6,430,465 | B2 | * | 8/2002 | Cutler ........................ 700/193 |

FOREIGN PATENT DOCUMENTS

| JP | 59-59227 | 4/1984 |
| WO | WO 96/29634 | 9/1996 |

* cited by examiner

*Primary Examiner*—Leo Picard
*Assistant Examiner*—Zoila Cabrera
(74) *Attorney, Agent, or Firm*—Westerman, Hattori, Daniels & Adrian, LLP (57) ABSTRACT

The present invention relates to a control method and a control apparatus for controlling two (two kinds of) driver mechanisms for relatively moving a main spindle along a single axis in an NC machine tool whereby the straightness of the work-piece machined surface can be finished with high accuracy. The control method of the invention controls operations of two driver mechanisms (124,125,126) for relatively moving a main spindle (104) along a single axis in an NC machine tool (100), and one of the driver mechanisms (124 or 125,126) is driven to relatively move the main spindle (104) in a positive direction along the axis during machining, the other driver mechanism (124 or 125,126) is driven to relatively move the main spindle (104) in a negative direction along the axis during machining. Since the respective driver mechanisms (124,125,126) are driven to move the main spindle (104) in only one of either the positive or negative direction along the axis, respectively, when the moving direction of the main spindle (104) is reversed, without being affected by backlash, the main spindle (104) can be positioned with high accuracy.

3 Claims, 9 Drawing Sheets

| ADDRESS | Y-AXIS POSITION DATA (mm) | CORRECTION AMOUNT ($\mu$m) |
|---|---|---|
| 1 | 0 | 0 |
| 2 | 200 | −0.7 |
| 3 | 400 | −1.7 |
| 4 | 600 | −3.2 |
| 5 | 800 | −5.5 |
| 6 | 1000 | −4.7 |
| 7 | 1200 | −3.2 |
| 8 | 1400 | −2.3 |
| 9 | 1600 | −0.7 |

FIG. 4

| Y-AXIS MOVING COURSE DATA (mm) | CORRECTION AXIS | CORRECTION VALUE ($\mu$m) |
|---|---|---|
| 0→200 | W | −0.7 |
| 200→400 | W | −1.0 |
| 400→600 | W | −1.5 |
| 600→800 | W | −2.3 |
| 800→1000 | W | 0.8 |
| 1000→1200 | Z | 1.5 |
| 1200→1400 | Z | 0.9 |
| 1400→1600 | Z | 1.6 |

| ADDRESS | X-AXIS POSITION DATA (mm) | Y-AXIS POSITION DATA (mm) | CORRECTION AMOUNT (μm) |
|---|---|---|---|
| 1 | 0 | 0 | −0.7 |
| 2 | 0 | 200 | −1.7 |
| 3 | 0 | 400 | −3.2 |
| 4 | 0 | 600 | −1.5 |
| 5 | 200 | 0 | −0.5 |
| 6 | 200 | 200 | −1.0 |
| 7 | 200 | 400 | −1.7 |
| 8 | 200 | 600 | −0.7 |
| ⋮ | ⋮ | ⋮ | ⋮ |

METHOD AND APPARATUS FOR CONTROLLING DRIVER MECHANISM IN NC MACHINE TOOL

BACKGROUND OF THE INVENTION

1. Field of the Invention

The present invention relates to a control method and a control apparatus for controlling operations of two (two kinds of) driver mechanisms for relatively moving a main spindle along a single axis in an NC machine tool.

2. Description of the Prior Art

Figure 8:
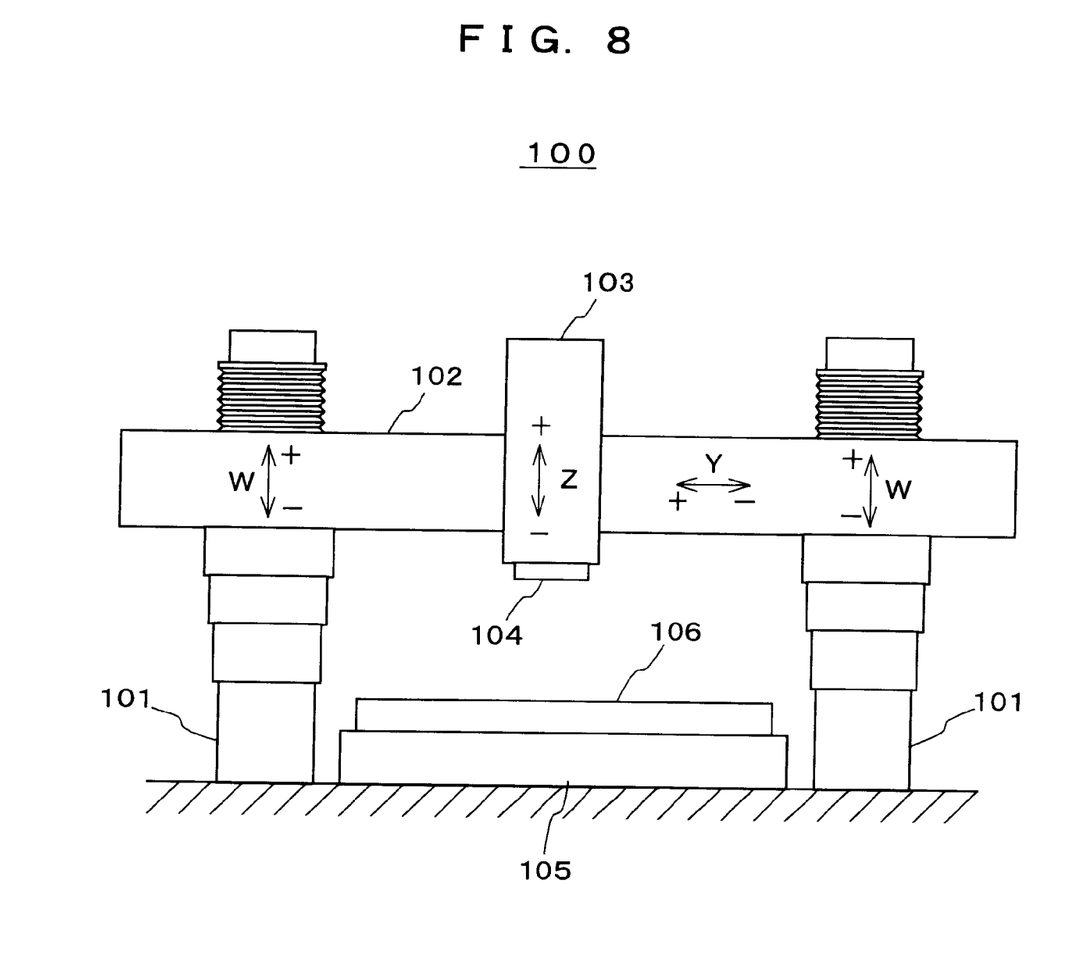
FIG. 8 is a front view showing the schematic construction of the machine tool according to the prior art.
Figure 9:
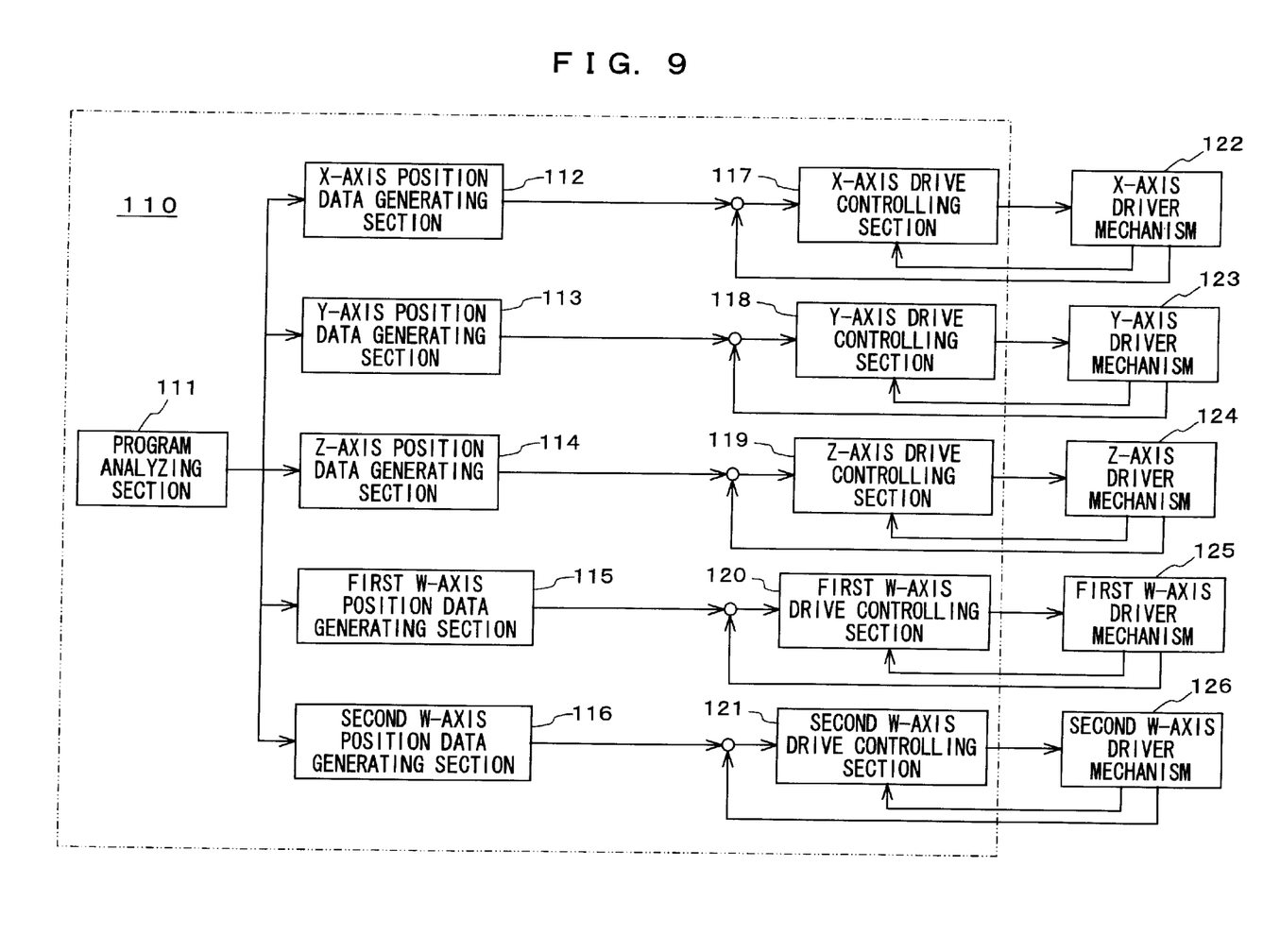
FIG. 9 is a block diagram showing the schematic construction of the control apparatus according the prior art.

An example of the NC machine tool comprised two driver mechanisms for relatively moving the main spindle along a single axis as mentioned above is shown in FIG. 8 and FIG. 9. FIG. 8 is a front view showing the schematic construction of the NC machine tool, and FIG. 9 is a block diagram showing the schematic construction of a control apparatus which numerically controls the NC machine tool.

As illustrated, the NC machine tool 100 is a so-called portal type machining center and mainly comprises: a pair of columns 101 and 101 erected on the installation surface with an appropriate distance therebetween; a crossbeam 102 extended over the columns 101 and 101 so as to be movable along the respective columns 101 and 101, that is, along feed axes in the direction of W shown by arrows (hereinafter, referred to as "W-axis"); a spindle head 103 provided on the crossbeam 102 so as to be movable along the longitudinal direction thereof, that is, along a feed axis in the direction of Y shown by arrows (hereinafter, referred to as "Y-axis"); a main spindle 104 which is rotatably supported on the spindle head 103 and provided so as to be movable along a feed axis in the direction of Z shown by arrows (hereinafter, referred to as "Z-axis"); a bed 105 disposed below the spindle head 103 between the columns 101 and 101; and a table 106 which is mounted on the bed 105 and provided so as to be movable along a feed axis in the direction perpendicular to the paper (hereinafter, this feed axis is referred to as "X-axis").

The crossbeam 102 is driven by a first W-axis driver mechanism 125 and a second W-axis driver mechanism 126 which are respectively provided on the respective columns 101 and 101 and each of which comprises a servomotor, ball screw, and ball nut and moves along the W-axis as mentioned above, and the main spindle 104 is driven by a Z-axis driver mechanism 124 comprising a servomotor, a ball screw, and a ball nut provided on the spindle head 103 and is moved along the Z-axis direction.

In addition, the spindle head 103 is driven by a Y-axis driver mechanism 123 comprising a servomotor, a ball screw, and a ball nut provided on the crossbeam 102 and moves along the Y-axis direction, and the table 106 is driven by an X-axis driver mechanism 122 comprising a servomotor, a ball screw, and a ball nut provided on the bed 105 and moves along the X-axis direction.

The X-axis driver mechanism 122, the Y-axis driver mechanism 123, the Z-axis driver mechanism 124, the first W-axis driver mechanism 125, and the second W-axis driver mechanism 126 are numerically controlled by a control apparatus 110 shown in FIG. 9. As shown in FIG. 9, this control apparatus 110 mainly comprises: a program analyzing section 111, an X-axis position data generating section 112, a Y-axis position data generating section 113, a Z-axis position data generating section 114, a first W-axis position data generating section 115, a second W-axis position data generating section 116, an X-axis drive controlling section 117, a Y-axis drive controlling section 118, a Z-axis drive controlling section 119, a first W-axis drive controlling section 120, and a second W-axis drive controlling section 121.

The program analyzing section 111 analyzes each command block of machining program stored in the control apparatus 110, extracts commands concerning moving position coordinates and feed speed, and outputs the position data and speed data thus extracted to the X-axis position data generating section 112, the Y-axis position data generating section 113, the Z-axis position data generating section 114, the first W-axis position data generating section 115, and the second W-axis position data generating section 116 related to the commands, respectively.

Then, the X-axis position data generating section 112, the Y-axis position data generating section 113, the Z-axis position data generating section 114, the first W-axis position data generating section 115, and the second W-axis position data generating section 116, respectively, generate target position data at predetermined-time intervals on the basis of the position data and speed data received from the program analyzing section 111 and output the generated target position data to the corresponding X-axis drive controlling section 117, the Y-axis drive controlling section 118, the Z-axis drive controlling section 119, the first W-axis drive controlling section 120, and the second W-axis drive controlling section 121, respectively.

The X-axis drive controlling section 117, the Y-axis drive controlling section 118, the Z-axis drive controlling section 119, the first W-axis drive controlling section 120, and the second W-axis drive controlling section 121, respectively, calculate the deviations between the respectively received target position data and present positions fed back from the correspondingly set X-axis driver mechanism 122, the Y-axis driver mechanism 123, the Z-axis driver mechanism 124, the first W-axis driver mechanism 125, and the second W-axis driver mechanism 126, respectively, calculate speed command values by multiplying the deviations by a position loop gain, and then calculate the deviations between the calculated speed command values and present speed data fed back from, again, the X-axis driver mechanism 122, the Y-axis driver mechanism 123, the Z-axis driver mechanism 124, the first W-axis driver mechanism 125, and the second W-axis driver mechanism 126, calculate torque command signals by multiplying the deviations by a speed loop gain, and thereafter output drive currents depending on the calculated torque command signals to the X-axis driver mechanism 122, the Y-axis driver mechanism 123, the Z-axis driver mechanism 124, the first W-axis driver mechanism 125, and the second W-axis driver mechanism 126, respectively.

Then, with respect to the servomotors of the respective X-axis driver mechanism 122, the Y-axis driver mechanism 123, the Z-axis driver mechanism 124, the first W-axis driver mechanism 125, and the second W-axis driver mechanism 126, servomotors which compose the respective mechanisms are driven by the inputted drive currents and by operations of these X-axis driver mechanism 122, the Y-axis driver mechanism 123, the Z-axis driver mechanism 124, the first W-axis driver mechanism 125, and the second W-axis driver mechanism 126, as mentioned above, the table 106 is moved along the X-axis direction, the spindle head 103 is moved along the Y-axis direction, the main spindle 104 is moved along the Z-axis direction, and the crossbeam 102 is moved along the W-axis direction.

Thus, according to the NC machine tool 100, by moving the table 106 along the X-axis direction, the spindle head 103 along the Y-axis direction, the main spindle 104 along the Z-axis direction, and the crossbeam 102 along the W-axis direction, respectively, a work-piece (not illustrated) mounted and fixed on the table 106 and the main spindle 104 can be relatively moved along the respective directions of the X-axis, Y-axis, Z-axis, and W-axis, and three-dimensional machining can be performed on the work-piece. In addition, both Z-axis and W-axis are feed axes in the up-and-down direction and will be generically called a Z'-axis in the following description.

Figure 10:
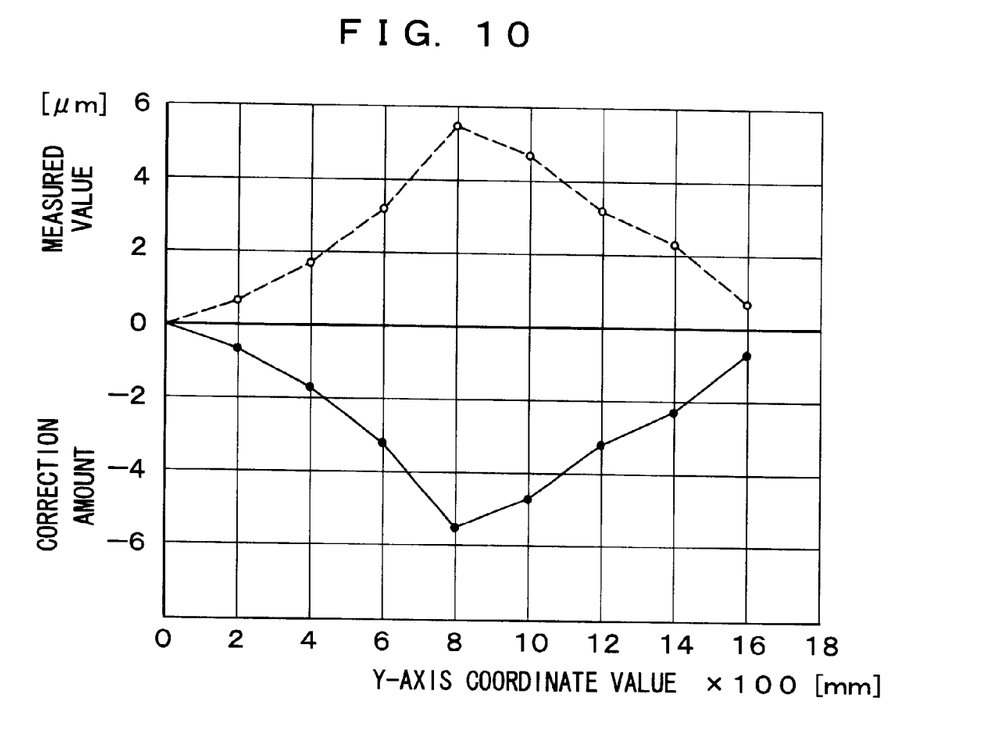
FIG. 10 is an explanatory diagram for explaining phenomena which occur in the prior-art machine tool

In general, the table 106, spindle head 103, main spindle 104, and crossbeam 102 are guided by sliding guide portions (not illustrated) which are, respectively, correspondingly provided and moved along the aforementioned direction, respectively. Accordingly, straightness of a work-piece machined surface depends on the straightness of the sliding guide portions. For example, in a condition where a milling cutter is fitted on the main spindle 104 and the spindle head 103 is fixed in terms of the Z'-axis direction, when the work-piece upper surface is machined by moving the milling cutter from the work-piece zero point along the Y-axis + direction, waviness is formed on the work-piece machined surface under influence of the straightness of the Y-axis sliding guide portion. FIG. 10 shows an example thereof. In FIG. 10, a dashed line is shown as the shape of the work-piece machined surface, and in this case, it can be read that a characteristic where the sliding guide portion is convex is provided. Accordingly, in order to bring the straightness of the work-piece machined surface as close to 0 as possible and attain high accuracy in this case, it is necessary to correct the position of the main spindle 104 in terms of the Z'-axis so as to become as shown by the continuous line in FIG. 10.

In addition, although the crossbeam 102 is constructed to have predetermined rigidity, as a matter of course, it cannot be a perfectly rigid body, therefore when the spindle head 103 is located at the end portion of the crossbeam 102 which is supported on both sides thereof, a flexure at the same portion of the crossbeam 102 is different from a flexure when the spindle head 103 is located at the central portion of the crossbeam 102, and a flexure when the spindle head 103 is located at the central portion becomes the greatest. Namely, a flexure diagram of the crossbeam 102 according to a movement of the spindle head 103 along the Y-axis direction is exactly similar to the diagram shown by the continuous line in FIG. 10. In particular, the larger the machine size becomes, the wider the interval between the columns 101 and 101 becomes and also the heavier the weight of the spindle head 103 becomes, therefore the above-described difference in flexure becomes large. Consequently, in order to make the straightness of the work-piece machined surface high in accuracy, it is necessary to correct the position of the main spindle 104 in terms of the Z'-axis so as to become as shown by the dashed line in FIG. 10.

In the case of the aforementioned two examples, it is possible to perform the above correction by moving the crossbeam 102 along the W-axis direction in accordance with the position of the spindle head 103 in terms of the Y-axis direction or moving the main spindle 104 along the Z-axis direction.

However, in a case where the above correction is performed by moving only one of either the crossbeam 102 or the main spindle 104, when the moving direction is reversed from the positive direction to the negative direction or from the negative direction to the positive direction, a problem occurs such that a correction as it has been set cannot be performed due to backlash of a ball screw mechanism.

The present invention has been made in view of the abovementioned actual circumstances and aims to provide a control method and a control apparatus for controlling two driver mechanisms for relatively moving a main spindle along a single axis in an NC machine tool whereby the straightness of the work-piece machined surface can be finished with high accuracy.

SUMMARY OF THE INVENTION

In order to solve the above-described problem, the present invention relates to a control method for controlling operations of two (two kinds of) driver mechanisms for relatively moving a main spindle along a single axis during machining in an NC machine tool, the control method comprising the steps of:

driving one of the driver mechanisms so as to relatively move the main spindle in a positive direction along the axis; and driving the other driver mechanism so as to relatively move the main spindle in a negative direction along the axis.

According to the invention, one of the driver mechanisms is driven so as to relatively move the main spindle in a positive direction along the axis during machining. On the other hand, the other driver mechanism is driven so as to relatively move the main spindle in a negative direction along the axis during machining. Therefore, the respective driver mechanisms are driven so as to move the main spindle in only one of either the positive or negative direction along the axis, respectively. Accordingly, even in a case where ball screw mechanism is employed in the respective driver mechanisms, when the moving direction along the axis of the main spindle is reversed from the positive direction to the negative direction or from the negative direction to the positive direction, without being affected by backlash thereof, the main spindle can be positioned in the moving direction along the axis with high accuracy.

For example, in terms of a machine tool comprised the two driver mechanisms so as to move the main spindle in the up-and-down direction and also comprised another driver mechanism to move the main spindle in the horizontal direction, in a case such that machining is performed by moving the main spindle in the horizontal direction and waviness is formed on the machined surface under influence of the straightness of a sliding guide portion to guide in the horizontal direction, a correction for waviness removal is performed by moving the main spindle up and down during machining so as to eliminate such waviness. In such a case, if the main spindle is moved up and down by means of only one driver mechanism and a ball screw mechanism is employed in the driver mechanism, accurate correction cannot be performed due to backlash thereof. According to the present invention, even in the case where such a correction is performed, since the respective driver mechanisms are driven so as to move the main spindle in only one of either the upward or downward (positive or negative) direction, respectively, the correction can be accurately performed without being affected by the backlash. Furthermore, machining accuracy which becomes high owing to the present invention is not limited to form accuracy including the straightness and the like but dimensional accuracy including step dimensions can become high.

The driver mechanisms can be controlled on the basis of a machining program and also can be performed on the basis of correction data. In the case where the driver mechanisms are controlled on the basis of correction data, such control can be preferably carried out by using the following control apparatus.

Namely, for use with an NC machine tool comprising a main spindle, two (two kinds of) first driver mechanisms for relatively moving the main spindle along a first axis, and a second driver mechanism for relatively moving the main spindle at least along a second axis different from the first axis, a control apparatus for controlling operations of the first and second driver mechanisms, the control apparatus comprising:

position data generating sections respectively provided for the first and second driver mechanisms for generating target position data indicative of a destination of the main spindle for the first and second driver mechanisms on the basis of position data provided by the machining program;

first and second drive controlling sections respectively provided for the first and second driver mechanisms for driving and controlling the first and second driver mechanisms on the basis of the target position data generated by the respective position data generating sections so as to cause the main spindle to reach the target position;

a correction data storage section storing therein correction amounts for the movement of the main spindle along the first axis in connection with position data indicative of positions at least on the second axis; and a correction data generating section which, when the main spindle is to be relatively moved along the first axis during machining, calculates a correction value for the movement of the main spindle along the first axis on the basis of a correction amount acquired from the correction data storage section and, if the calculated correction value indicates that the main spindle is to be relatively moved in a positive direction along the first axis, outputs the correction value to one of the first drive controlling sections to drive a corresponding one of the first driver mechanisms to relatively move the main spindle in the positive direction along the first axis and, if the calculated correction value indicates that the main spindle is to be relatively moved in a negative direction along the first axis, outputs the correction value to the other first drive controlling section to drive a corresponding the other first driver mechanism to relatively move the main spindle in the negative direction along the first axis.

In the correction data storage section, correction amounts for the movement of the main spindle along the first axis when the main spindle reaches predetermined plurality of positions on the second axis are stored, and when the main spindle during machining is relatively moved along the second axis and reaches an applicable position, the correction amount at the position stored in the correction data storage section is read out and a correction value to be corrected is calculated on the basis of the difference between the read-out correction amount and the preceding correction amount by the correction data generating section.

Then, if the calculated correction value indicates that the main spindle is to be relatively moved in the positive direction along the first axis, the correction data generating section outputs the correction value to one of the first drive controlling sections to drive a corresponding one of the first driver mechanisms to relatively move the main spindle in the positive direction along the first axis. On the other hand, if the calculated correction value indicates that the main spindle is to be relatively moved in a negative direction along the first axis, the correction data generating section outputs the correction value to the other first drive controlling section to drive a corresponding the other first driver mechanism to relatively move the main spindle in the negative direction along the first axis.

Thus, the two driver mechanisms are respectively driven so as to move the main spindle in only one of either the positive or negative direction along the first axis, and even in the case where the ball screw mechanism is employed in the respective driver mechanisms, when the moving direction along the first axis of the main spindle is reversed from the positive direction to the negative direction or from the negative direction to the positive direction, without being affected by backlash thereof, the main spindle can be positioned in the moving direction along the first axis with high accuracy and the form accuracy including the straightness and the dimensional accuracy including the step dimensions can become high.

In addition, the control apparatus may be constructed such that the correction data storage section stores therein correction values for the movement of the main spindle along the first axis in connection with the position data indicative of the positions at least on the second axis along with data indicative of which of the first driver mechanisms is to be subjected to correction, wherein, when the main spindle is to be relatively moved along the first axis during machining, the correction data generating section, instead of performing the above process, acquires from the correction data storage section a correction value and the data indicative of which of the first driver mechanisms is to be subjected to the correction, and outputs the acquired correction value to the first drive controlling section indicated by the data to drive the first driver mechanism to relatively move the main spindle.

In the correction data storage section, correction values for the movement of the main spindle along the first axis when the main spindle reaches predetermined plurality of positions on the second axis and the data indicative of which of the first driver mechanisms is to be subjected to the correction are stored, and when the main spindle during machining is relatively moved along the second axis and reaches an applicable position, the correction amount at the position and the data indicative of which of the first driver mechanisms is to be subjected to the correction stored in the correction data storage section is read out by the correction data generating section, and the correction data generating section outputs the read-out correction value to the first drive controlling section indicated by the data to drive the first driver mechanism to relatively move the main spindle.

Thus, similarly, according to such a control apparatus, the two driver mechanisms are respectively driven so as to move the main spindle in only one of either the positive or negative direction along the first axis, and even in the case where the ball screw mechanism is employed in the respective driver mechanisms, when the moving direction along the first axis of the main spindle is reversed from the positive direction to the negative direction or from the negative direction to the positive direction, without being affected by backlash thereof, the main spindle can be positioned in the moving direction along the first axis with high accuracy and the form accuracy including the straightness and the dimensional accuracy including the step dimensions can become high.

DESCRIPTION OF THE PREFERRED EMBODIMENT

Figure 1:
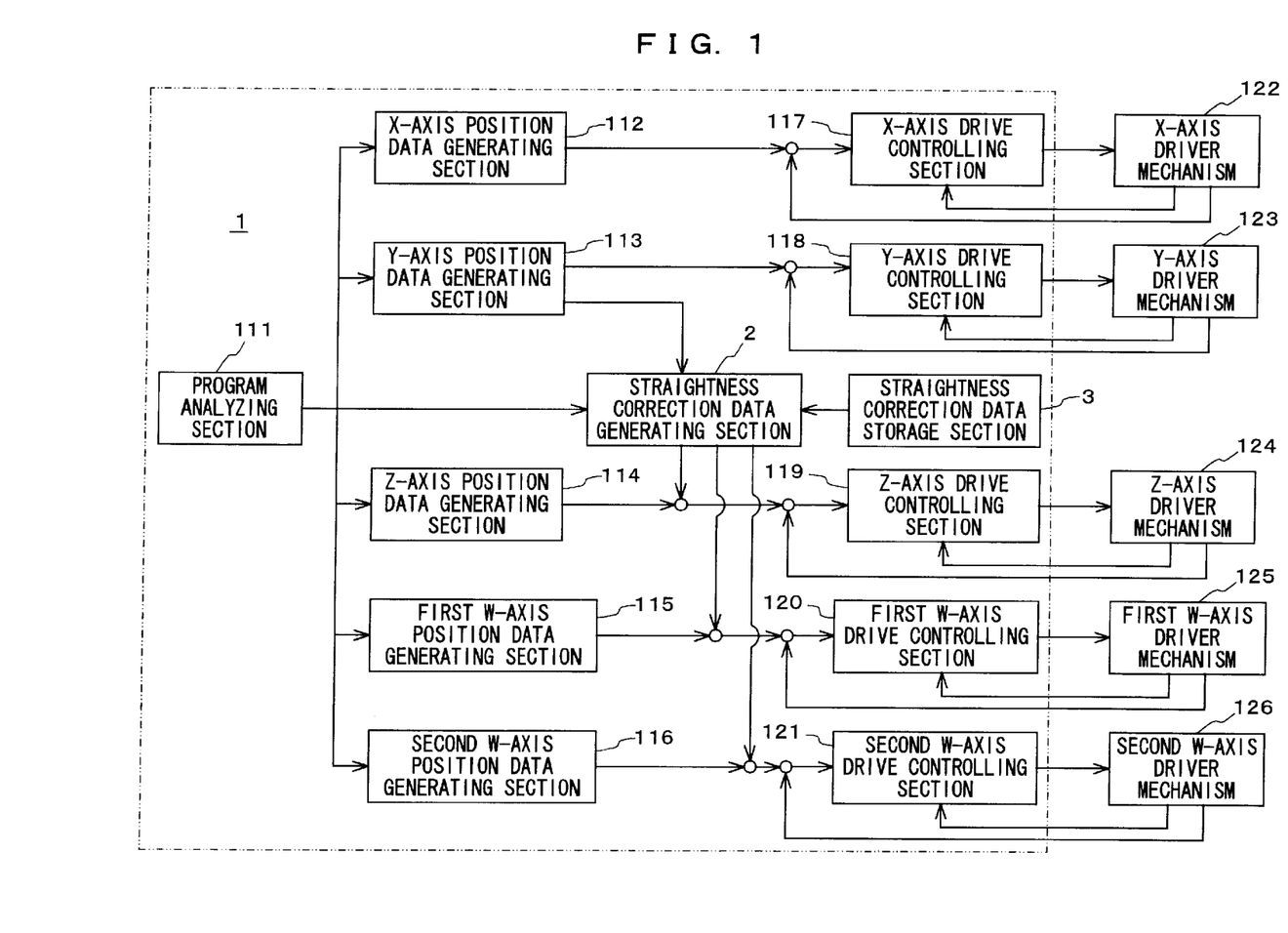
FIG. 1 is a block diagram showing the schematic construction of the control apparatus according to an embodiment of the invention.

Hereinafter, a detailed embodiment of the present invention will be described with reference to the attached drawings. FIG. 1 is a block diagram showing the schematic construction of the control apparatus according to the present embodiment. A control apparatus 1 of the present embodiment controls the operations of the aforementioned machine tool 100 shown in FIG. 8 and carries out the control so as to move the main spindle 104 straight along the Y-axis direction. Also, as shown in FIG. 1, the control apparatus 1 of the present embodiment comprises, in addition to the construction of the prior-art control apparatus 110 shown in FIG. 9, a straightness correction data generating section 2 and a straightness correction data storage section 3. Accordingly, the same symbols will be used for constructional portions which are the same as those of the previously mentioned control apparatus 110 and a detailed description thereof will be omitted here.

In the straightness correction data storage section 3, in order to move the main spindle 104 straight along the Y-axis direction, correction data for correcting operations thereof along the Z'-axis direction is stored. Herein, in the present embodiment, it is supposed that when the main spindle 104 which is fixed on the Z'-axis direction is moved along the Y-axis direction and machining is performed, the machined surface produces a convex phenomenon shown by the dashed line in FIG. 10, the correction data is set to values which can eliminate such a convex phenomenon and make the machined surface straight, that is, values plotted with black dots in the diagram, and in the straightness correction data storage section 3, correction amounts set at predetermined intervals in terms of the Y-axis coordinates are stored as a data table shown in FIG. 3.

Figure 2:
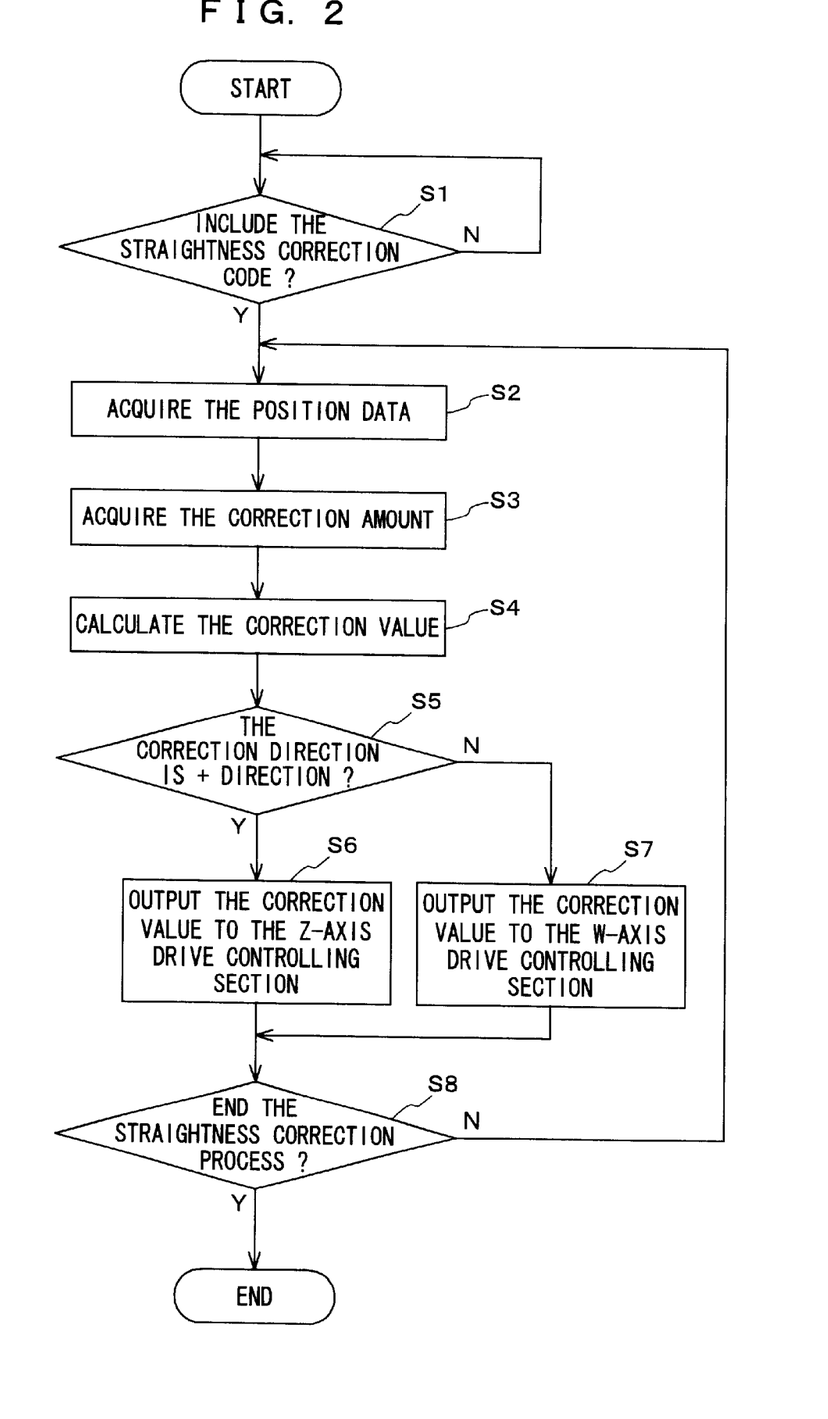
FIG. 2 is a flowchart showing processing procedures in the straightness correction data generating section according to the embodiment.

The straightness correction data generating section 2 is a functional section which starts, when a straightness correction code is inputted from a program analyzing section 111, a straightness correction process, receives position data of the main spindle 104 in terms of the Y-axis from the Y-axis position data generating section 113, reads out a correction amount corresponding thereto from the straightness correction data storage section 3, calculates a correction value so as to relatively move the main spindle 104 along the Z'-axis direction, then outputs the correction value to a Z-axis drive controlling section 119 or a first W-axis drive controlling section 120 and a second W-axis drive controlling section 121, drives a Z-axis driver mechanism 124 or a first W-axis driver mechanism 125 and a second W-axis driver mechanism 126, and corrects the position of the main spindle 104 along the Z'-axis direction, and executes processes shown in FIG. 2. Herein, the straightness correction code is a code provided by the machining program when a straightness correction is performed.

Concretely, whether a straightness correction code is included in the machining program or not is analyzed by the program analyzing section 111 and if a straightness correction code is included, it is outputted to the straightness correction data generating section 2, whereupon the straightness correction data generating section 2 executes the subsequent correcting process (Step S1).

When the straightness correction code is inputted, then the straightness correction data generating section 2 sequentially receives position data of the main spindle 104 in terms of the Y-axis which is output from the Y-axis position data generating section 113 (Step S2), searches on the basis of the position data in the data table stored in the straightness correction data storage section 3 and acquires a correction amount corresponding to such a position (Step 3). For example, in a case where the main spindle 104 is moved from the position of Y=0 mm to the position of Y=800 mm, each time position data that is output from the Y-axis position data generating section 113 becomes 0 mm, 200 mm, 400 mm, 600 mm, and 800 mm, correction amounts of 0 μm, −0.7 μm, −1.7 μm, −3.2 μm, and −5.5 μm are acquired by the straightness correction data generating section 2, respectively.

When the correction amount is acquired, then the straightness correction data generating section 2 calculates a moving amount to move the main spindle 104 from the present position along the Z'-axis direction, that is, a correction value (Step 4), thereafter the straightness correction data generating section 2 outputs, if the calculated correction value is positive, the correction value to the Z-axis drive controlling section 119 (Step 6) and outputs, if 0 or less, the correction value to the first W-axis drive controlling section 120 and the second W-axis drive controlling section 121 (Step S7). Then, the Z-axis drive controlling section 119, the first W-axis drive controlling section 120, and the second W-axis drive controlling section 121 drive the Z-axis driver mechanism 124, the first W-axis driver mechanism 125, and the second W-axis driver mechanism 126 on the basis of the inputted correction value, respectively. Consequently, the main spindle 104 is moved by the amount of the correction value along the Z'-axis direction.

For example, if the main spindle 104 moves from the position of Y=200 mm to the position of Y=400 mm, the correction amount of −0.7 μm at the 200 m position is subtracted from the correction amount of −1.7 μm at the 400 mm position, and the correction value is calculated at −1.0 μm. Then, since this correction value is a negative value, this is output to the first W-axis drive controlling section 120 and the second W-axis drive controlling section 121, respectively, and while moving from the position of Y=200 mm to the position of Y=400 mm, the main spindle 104 is moved along the W-axis direction (Z'-axis direction) by −1.0 μm. Also, while the main spindle 104 moves from the position of Y=1000 mm to the position of Y=1200 mm, the correction amount of −4.7 μm at the 1000 mm position is subtracted from the correction amount of −3.2 μm at the 1200 mm position, and the correction value is calculated at 1.5 μm. Then, since this correction value is a positive value, this is output to the Z-axis drive controlling section 119, and while moving from the position of Y=1000 mm to the position of Y=1200 mm, the main spindle 104 is moved along the Z-axis direction (Z'-axis direction) by 1.5 μm.

Thereafter, the above processes are repeated until a straightness correction code is inputted from the program analyzing section 111, and after the straightness correction code is inputted, such processes are ended (Step S8).

Thus, according to the control apparatus 1 of the present embodiment, when the position of the main spindle 104 is corrected along the Z'-axis direction, only the Z-axis driver mechanism 124 is driven so as to move the main spindle 104 in the positive direction along the Z'-axis direction. On the other hand, when the position of the main spindle 104 is corrected in the negative direction, only the first W-axis driver mechanism 125 and the second W-axis driver mechanism 126 are driven so as to move the main spindle 104 in the negative direction along the Z'-axis. Accordingly, when the moving direction along the Z'-axis of the main spindle 104 is reversed from the positive direction to the negative direction or from the negative direction to the positive direction, without being affected by the backlash of the Z-axis driver mechanism 124, the first W-axis driver mechanism 125, and the second W-axis driver mechanism 126, the main spindle 104 can be positioned in the moving direction along the Z'-axis with high accuracy. Thus, correction of the straightness caused by flexure of the sliding guide portion to guide the spindle head 103 along the Y-axis direction and crossbeam 102 and dimensioning of a machined surface having steps can be performed with high accuracy.

Hereinbefore, an embodiment of the present invention has been described, however, needless to say, detailed modes of the present invention are not limited hereto. For example, in the aforementioned embodiment, in a case where the straightness correction is performed only for certain set moving courses of the main spindle 104, since the correction value of each moving course along the Y-axis direction can be calculated beforehand, a construction may be employed such that, the calculated correction values and drive axis which are driven with such correction values are stored in the straightness correction data storage section 3 beforehand, and after a straightness correction code is inputted from the program analyzing section 111 to the straightness correction data generating section 2, the straightness correction process is started, position data of the main spindle 104 in terms of the Y-axis is received from the Y-axis position data generating section 113, a correction value and drive axis data corresponding thereto are read out from the straightness correction data storage section 3, and the correction value is output to the drive controlling section corresponding to the acquired drive axis data so as to move the main spindle 104 along the Z'-axis direction. Hereinafter, this mode will be described in further detail.

Figure 3:
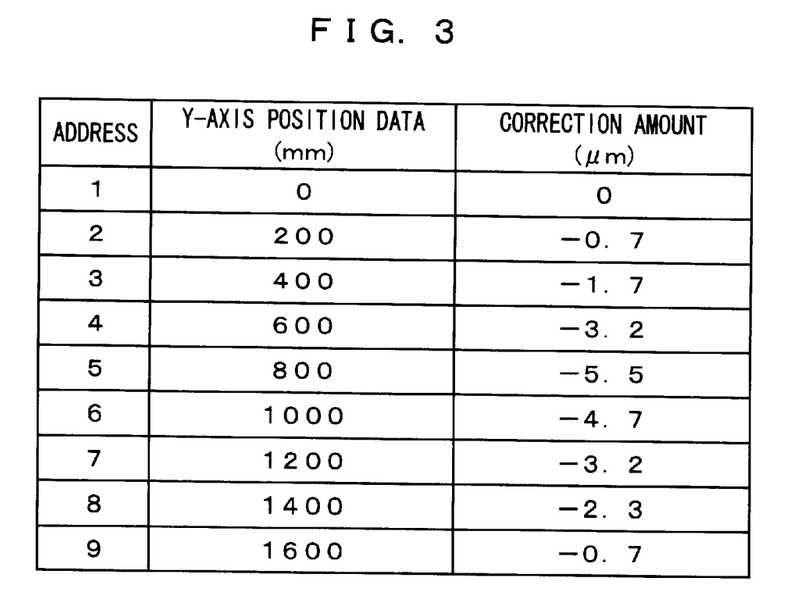
FIG. 3 is an explanatory diagram showing a data table stored in the straightness correction data storage section according to the embodiment.
Figure 4:
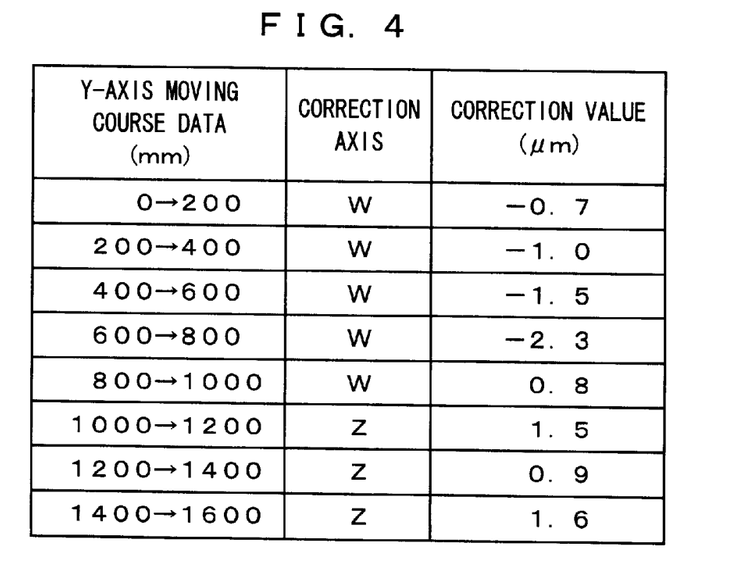
FIG. 4 is an explanatory diagram showing a data table stored in the straightness correction data storage section according to another embodiment of the invention.

For example, when straightness correction is performed for a course where the main spindle 104 is moved from Y=0 mm to Y=1600 mm along the Y-axis direction, the correction values of the respective moving courses along the Y-axis direction are calculated on the basis of the correction data shown in FIG. 3 in such a manner as in the above embodiment. When drive axis to be driven is determined depending on whether the calculated correction values are positive or negative, the results are as shown in FIG. 4. Then the above data is stored in the straightness correction data storage section 3 as a data table. Also in this case, if the correction value is positive, the Z-axis is driven, and if the correction value is negative, the W-axis is driven.

Figure 5:
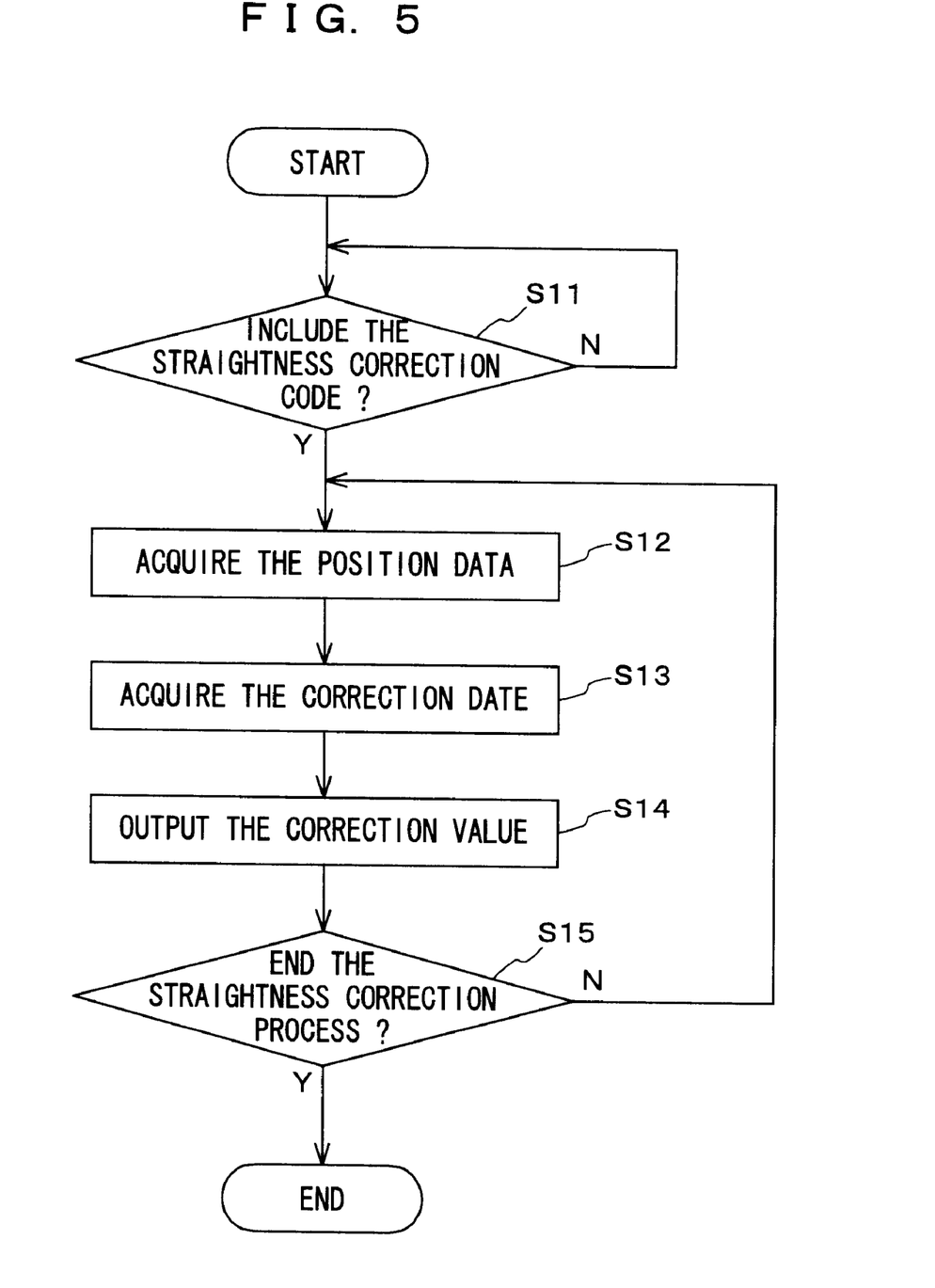
FIG. 5 is a flowchart showing processing procedures in the straightness correction data generating section according to another embodiment of the invention.

Then, processes shown in FIG. 5 is executed in the straightness correction data generating section 2. Namely, first, whether a straightness correction code is included in the machining program or not is analyzed by the program analyzing section 111, and if a straightness correction code is included, it is output to the straightness correction data generating section 2, whereupon the straightness correction data generating section 2 executes the subsequent correcting processes (Step S11).

When the straightness correction code is inputted, then the straightness correction data generating section 2 sequentially receives position data of the main spindle 104 in terms of the Y-axis which is output from the Y-axis position data generating sections 113 (Step 12), a search on the basis of this position data in the data table stored in the straightness correction data storage section 3 is performed, and a correction data according to the correction value and the drive axis corresponding to the position are acquired (Step S13).

Then, the straightness correction data generating section 2 outputs the acquired correction value to the drive controlling section corresponding to the simultaneously acquired drive axis data (Step S14). Thus, the driver mechanism corresponding to the drive controlling section is driven so as to move the main spindle 104 along the Z'-axis direction by the amount of the correction value. For example, in a case where the main spindle 104 moves from the position of Y=0 mm in the positive direction to the position of Y=200 mm, a correction value "−0.7 μm" and drive axis data "W-axis" are acquired by the straightness correction data generating section 2, then this correction value is output from the straightness correction data generating section 2 to the first and second W-axis drive controlling sections 120 and 121, the main spindle 104 is moved along the W-axis direction (Z'-axis direction) by −0.7 μm while it moves from the position of Y=0 mm in the positive direction to the position of Y=200 mm. Also, when the main spindle 104 moves from the position of Y=1400 mm to the position of Y=1200 mm, it is recognized that the moving direction is reversed to the Y-axis moving course data of the data table "1200→1400", the correction value "−0.9 μm" and driving axis data "W-axis" are acquired by the straightness correction data generating section 2, then this correction value is output from the straightness correction data generating section 2 to the first and second W-axis drive controlling sections 120 and 121, the main spindle 104 is moved along the W-axis direction (Z'-axis direction) by −0.9 μm while it moves from the position of Y=1400 mm to the position of Y=1200 mm.

Thereafter, the above processes are repeated until a straightness correction code is inputted from the program analyzing section 111, and after a straightness correction code is inputted, the processes are ended (Step S15).

Thus, similar to the above embodiment, according to this mode, when the position of the main spindle 104 is corrected along the Z'-axis direction, it also becomes possible to drive only the Z-axis driver mechanism 124, whereby moving the main spindle 104 in the positive direction along the Z-axis. On the other hand, when the position of the main spindle 104 is corrected in the negative direction, it also becomes possible to drive only the first and second W-axis driver mechanism 125 and 126, whereby moving the main spindle 104 in the negative direction along the W-axis. When the moving direction along the Z'-axis of the main spindle 104 is reversed from the positive direction to the negative direction or from the negative direction to the positive direction, without being affected by the backlash of the Z-axis driver mechanism 124, a first and second driver mechanism 125 and 126, the main spindle 104 can be positioned in the moving direction along the Z'-axis with high accuracy. Therefore, correction of the flexure due to the sliding guide portion to guide the spindle head 103 in the Y-axis direction and the crossbeam 102 and dimensioning of a machined surface having steps can be performed with high accuracy.

In addition, in the above two embodiments, description has been made on the basis of the moving amounts stored in the data table, however, even in the case of a moving amount that is not included in the data table, a correction in proportion with the correction amounts of the data table is performed. Moreover, in the above two embodiments, correction has been performed only during the period from the input of a straightness correction code from the program analyzing section 111 to the next input of the same cord, however, the present invention is not limited hereto, correction may be performed for all of the Y-axis moves during machining operation.

Figure 6:
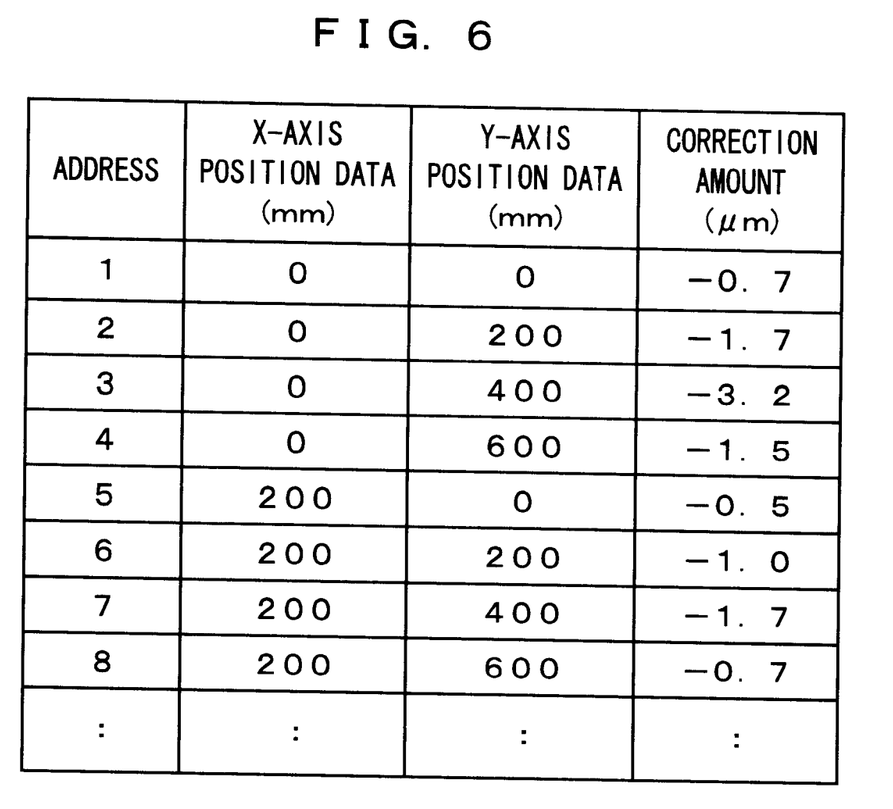
FIG. 6 is an explanatory diagram showing a data table stored in the straightness correction data storage section according to another embodiment of the invention.
Figure 7:
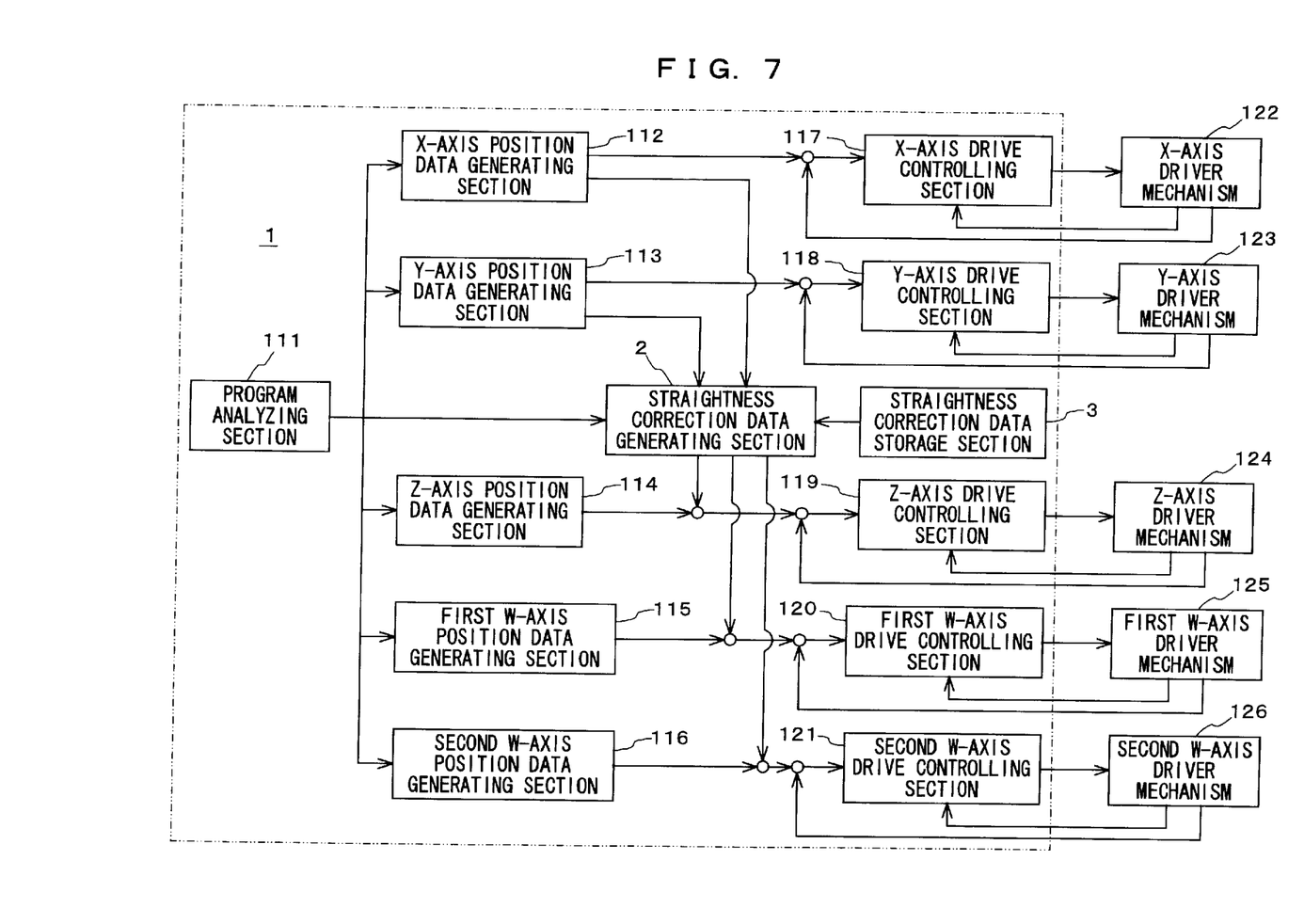
FIG. 7 is a block diagram showing the schematic construction of the control apparatus according to another embodiment of the invention.

In the above embodiments, the straightness correction when the main spindle 104 is moved along the Y-axis direction has been exemplified, and also when the main spindle 104 is moved along the X-axis direction, the straightness can be corrected by a similar mode. Moreover, as a matter of course, also when the main spindle 104 is moved in terms of the X-axis and Y-axis, the straightness can be corrected, and in such a case, it is preferable that the correction data shown in FIG. 6 is stored in the straightness correction data storage section 3 beforehand, as shown in FIG. 7, the position data of the main spindle 104 in terms of the X-axis and Y-axis, which is output from the X-axis position data generating section 112 and the Y-axis position data generating section 113 is received one after another by the straightness correction data generating section 2, and processes similar to the aforementioned processes are performed on the basis of the received position data by the straightness correction data generating section 2.

In addition, it is needless to explain that when moving the main spindle 104 in the Z'-axis direction so as to correct the straightness, by moving position commands in the machining program, only the Z-axis driver mechanism 124 can be driven so as to move the main spindle 104 in the positive direction along the Z-axis, and only the first and second W-axis driver mechanisms 125 and 126 are driven so as to move the main spindle 104 in the negative direction along the W-axis. For example, when moving the main spindle 104 in the positive direction along the Z'-axis, Z is issued as a command, while moving in the negative direction along the Z'-axis, W is issued as a command.

Adding an explanation by way of precaution, in the above embodiments, the Z-axis driver mechanism 124 is driven when the correction value is positive and the first and second W-axis driver mechanism 125 and 126 are driven when the correction value is negative. However, also in an alternative construction such that the first and second W-axis driver mechanism 125 and 126 are driven when the correction value is positive and the Z-axis driver mechanism 124 is driven when the correction value is negative, no problems exist.

What is claimed is:

1. A control method for controlling operations of two first driver mechanisms for relatively moving a main spindle along a first axis and a second driver mechanism for relatively moving the main spindle at least along a second axis different from the first axis during machining in an NC machine tool, the control method comprising the steps of:

generating and storing correction data for the movement of the main spindle along the first axis in dependency of position data for at least the second axis;

calculating a correction value for the movement of the main spindle along the first axis on the basis of the correction data when the main spindle is to be relatively moved along the first axis during machining;

if the calculated correction value indicates that the main spindle is to be relatively moved in a positive direction along the first axis, driving one of the first driver mechanisms so as to relatively move the main spindle in the positive direction along the first axis on the basis of the calculated correction value; and if the calculated correction value indicates that the main spindle is to be relatively moved in a negative direction along the first axis, driving the other first driver mechanism so as to relatively move the main spindle in the negative direction along the first axis on the basis of the calculated correction value.

2. A control apparatus for use with an NC machine tool comprising a main spindle, two first driver mechanisms for relatively moving the main spindle along a first axis, and a second driver mechanism for relatively moving the main spindle at least along a second axis different from the first axis, a control apparatus for controlling operations of the first and second driver mechanisms, the control apparatus comprising:

position data generating sections respectively provided for the first and second driver mechanisms for generating target position data indicative of a destination of the main spindle for the first and second driver mechanisms on the basis of position data provided by the machining program;

first and second drive controlling sections respectively provided for the first and second driver mechanisms for driving and controlling the first and second driver mechanisms on the basis of the target position data generated by the respective position data generating sections so as to cause the main spindle to reach the target position;

a correction data storage section storing therein correction amounts for the movement of the main spindle along the first axis in connection with position data indicative of positions at least on the second axis; and a correction data generating section which, when the main spindle is to be relatively moved along the first axis during machining, calculates a correction value for the movement of the main spindle along the first axis on the basis of a correction amount acquired from the correction data storage section and, if the calculated correction value indicates that the main spindle is to be relatively moved in a positive direction along the first axis, outputs the correction value to one of the first drive controlling sections to drive a corresponding one of the first driver mechanisms to relatively move the main spindle in the positive direction along the first axis and, if the calculated correction value indicates that the main spindle is to be relatively moved in a negative direction along the first axis, outputs the correction value to the other first drive controlling section to drive a corresponding the other first driver mechanism to relatively move the main spindle in the negative direction along the first axis.

3. An apparatus as set forth in claim 2, wherein the correction data storage section stores therein correction values for the movement of the main spindle along the first axis in connection with the position data indicative of the positions at least on the second axis along with data indicative of which of the first driver mechanisms is to be subjected to correction, wherein, when the main spindle is to be relatively moved along the first axis during machining, the correction data generating section acquires from the correction data storage section a correction value and the data indicative of which of the first driver mechanisms is to be subjected to the correction, and outputs the acquired correction value to the first drive controlling section indicated by the data to drive the first driver mechanism to relatively move the main spindle.

* * * * *